United States Patent [19]

Peña et al.

[11] Patent Number: 4,558,958
[45] Date of Patent: Dec. 17, 1985

[54] ENERGY CONSUMPTION INDICATING SYSTEM

[76] Inventors: José C. Pena; Roland J. Peña, both of 3809 Park Ave., Union City, N.J. 07087

[21] Appl. No.: 576,141

[22] Filed: Feb. 2, 1984

[51] Int. Cl.⁴ ............... F24D 3/02; G01K 17/10
[52] U.S. Cl. ............... 374/39; 165/11.1; 236/93 R; 237/8 R
[58] Field of Search ............... 374/39, 40; 165/12; 236/94

[56] References Cited

U.S. PATENT DOCUMENTS

| | | | |
|---|---|---|---|
| 2,329,813 | 9/1943 | Amsler | 374/39 |
| 3,995,686 | 12/1976 | Laube | 165/11 R |
| 4,049,044 | 9/1977 | Cohen | 165/11 R |
| 4,118,612 | 10/1978 | Gabus | 200/81.4 X |
| 4,221,260 | 9/1980 | Otala et al. | 374/39 X |
| 4,274,475 | 6/1981 | Rall et al. | 374/109 X |
| 4,308,992 | 1/1982 | Horton | 374/39 X |
| 4,363,441 | 12/1982 | Zeinberg | 236/94 X |
| 4,454,768 | 6/1984 | Nansel | 200/81.9 R X |
| 4,509,679 | 4/1985 | Longini | 237/8 R X |

Primary Examiner—Daniel M. Yasich
Attorney, Agent, or Firm—Louis E. Marn

[57] ABSTRACT

There is disclosed an energy consumption indicating system for a multi-occupancy dwelling including a plurality of units each having a space heat exchanger and a thermostat and wherein said multi-occupancy dwelling is provided with a main heat exchanger having an outlet conduit, an inlet conduit and at least one circulating pump and wherein a conduit member is provided for each unit in fluid communication to the main heat exchanger and the space heat exchanger in each unit and wherein fluid flow through each conduit member is effected in response to a thermostat in each unit and wherein a time meter for each unit is energized to measure time duration of fluid flow through the conduit member.

2 Claims, 1 Drawing Figure

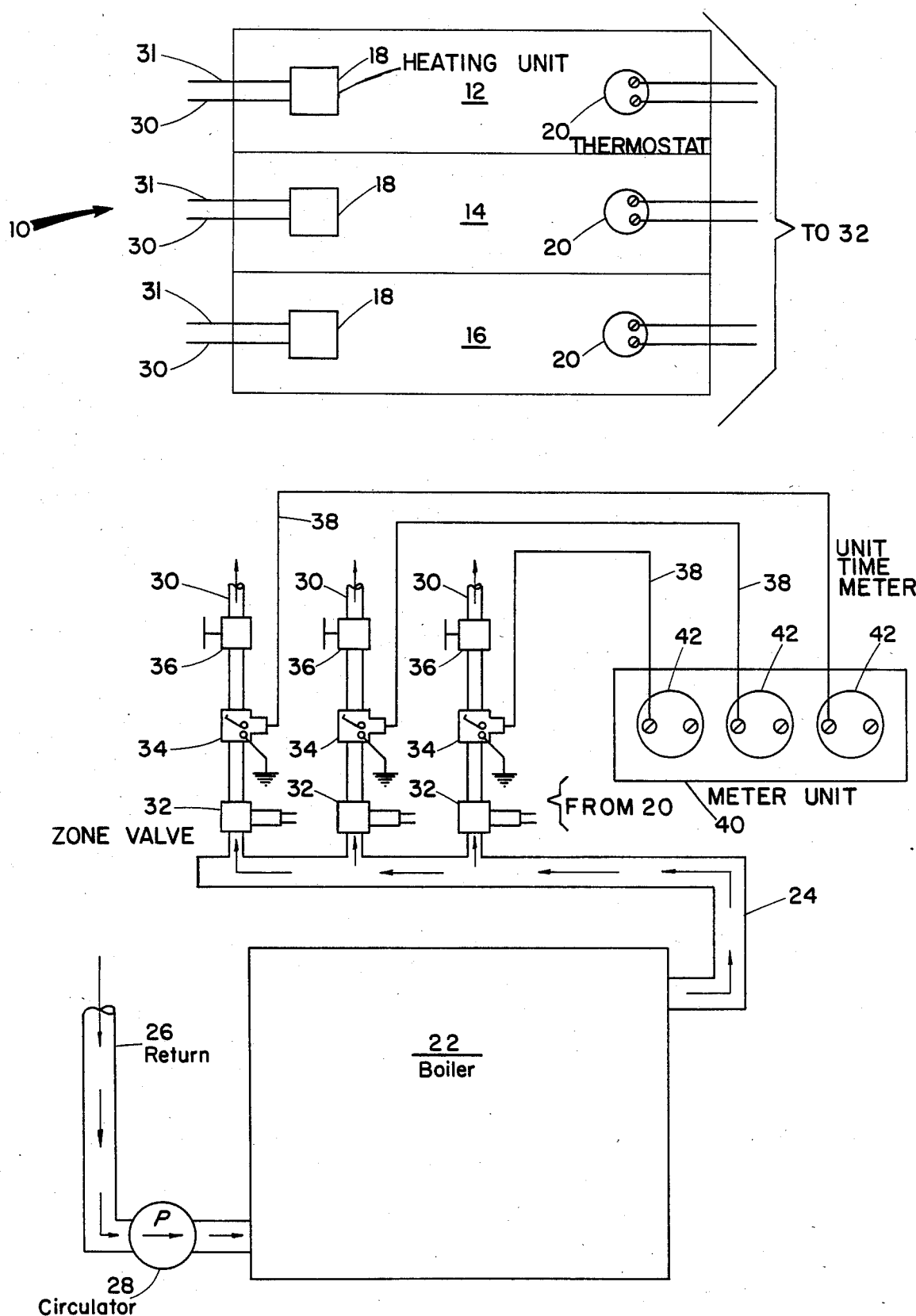

ENERGY CONSUMPTION INDICATING SYSTEM

FIELD OF THE INVENTION

This invention relates to energy consumption indicating systems, and more particularly to an energy consumption indicating system for a multi-occupancy dwelling.

BACKGROUND OF THE INVENTION

In many multi-occupancy buildings, such as apartment or office buildings, the amount or energy consumed for comfort heating is measured only by a central meter, indicating total energy consumption for the entire building. The cost of the energy used is reflected in the rental or maintenance charges paid by the occupants, but is not pro-rated on the basis of the actual amounts of energy used by the respective tenants, since there is no measurement of the respective amounts. In fact, some cities have ordinances requiring that the cost of electricity be included in the rental rate, in the case of all electrically heated apartments. Studies have shown that buildings wherein energy consumption is centrally metered regularly consume more energy per unit of space served than do buildings wherein energy use is individually metered, other conditions being equal. In most cases, the largest source of energy consumption in multiple-occupancy buildings is comfort temperature control.

Thus, an inequitable situation exists, particularly where the occupants of each individual unit have substantially varied preferences for particular temperature levels. Numerous systems have been proposed to remedy such situations. In this connection, note U.S. Pat. Nos. 1,344,813; 1,411,165; 3,979,952 and 3,995,686.

OBJECTS OF THE PRESENT INVENTION

An object of the present invention is to provide a novel energy consumption indicating system.

Another object of the present invention is to provide a novel energy consumption indicating system for steam or hot water heating system for multi-occupancy building.

Yet another object of the present invention is to provide a novel energy consumption indicating system permitting an individually controlled level of heat in the respective multi-occupancy building.

SUMMARY OF THE PRESENT INVENTION

These and other objects of the present invention are achieved by an energy consumption indicating system for a multi-occupancy dwelling including a plurality of units each having a space heat exchanger or heating units and a thermostat and wherein said multi-occupancy dwelling is provided with a main heat exchanger or boiler having an outlet conduit, an inlet conduit and at least one circulating pump and wherein a conduit member is provided for each unit in fluid communication to the main heat exchanger and the space heat exchanger in each unit and wherein fluid flow through each conduit member is effected in response to a thermostat in each unit and wherein a time meter for each unit is energized to measure time duration of fluid flow through the conduit member.

BRIEF DESCRIPTION OF THE DRAWINGS

The invention will be more clearly understood by reference to the following detailed description of an exemplary embodiment wherein the drawing illustrates a schematic flow diagram of the energy consumption indicating system of the present invention.

DETAILED DESCRIPTION OF THE INVENTION

Referring now to the drawings, there is illustrated a multi-occupancy dwelling, generally indicated as 10, comprised of three individual units 12, 14, and 16, each including a space heating unit 18. Each of the units 12, 14 and 16 are provided with thermostats 20 for sensing heat levels therein as well as to energize a system for providing energy to the space heating units 18 therein should the heat levels therein fall below a predetermined temperature level.

The multi-occupancy dwelling 10 is provided with a boiler, generally indicated as 22, including an outlet conduit 24 and a return conduit 26 including a pump 28. The outlet conduit 24 is in fluid communication with individual inlet conduits 30 for each unit 12, 14 and 16 and leading to the individual space heating units 18 therein. Each individual inlet conduit 30 is provided with a zone valve 32, a flow sensor switch 34 and glove valve 36. The zone valve 32 is an on-off type valve and is connected to a respective thermostat 20 each unit 12, 14 and 16, each including a space heat exchanger 18. Each of the units 12, 14 and 16 are provided with thermostats 20 for sensing heat levels therein as well as to energize a system for providing energy to the space heat exchangers 18 therein should the heat levels therein fall below a predetermined temperature level. The flow sensor switch 34 senses fluid flow and is provided with a lead 38.

The multi-occupancy dwelling 10 is provided with a meter unit, generally indicated as 40 including individual meter 42 connected to lead 38 measuring on-line time of fluid flow through the respective flow sensor switches 34, as more fully hereinafter discussed.

It is understood by one skilled in the art that the present invention does not relate to boiler operation, per se and temperature sensing of the intermediate heat transfer medium to energize boiler operation and the like, an operation well known to one skilled in the art.

In operation, assuming the use of water as the intermediate heat transfer medium and thus the use of the motor and pump assembly 28, and assuming the thermostat 20 in unit 12 generates a signal requiring heat input into the unit 12, the thus generated signal energizes the motor and pump assembly as well as the zone valve 32 in the inlet conduit 30 to unit 12. Once the zone valve 32 opens, the intermediate heat transfer medium is permitted to flow from outlet conduit 24 through inlet conduit 30 and thence to space heat exchanger 18 in unit 12 and via line 31 to return conduit 26. The intermediate heat transfer medium returns to the boiler 22 via a return conduit 26 and fluid flow is continued for such period of time as the thermostat 20 in unit 12 is calling for heat. Concomitantly, such period of time of fluid flow through the inlet conduit 30 of unit 12 is being measured by time meter 42 assigned to unit 12. It will be understood by one skilled in the art that the heating systems of the other units of the multi-occupancy dwelling 10 similarly function and are independent of the heating systems for the other units. It will be further understood that while one or more of the heating units may simultaneously be calling for heat, that one or more of the zone valves may be in an opened position to permit fluid flow into each unit of the multi-occupancy dwelling. Additionally, while the present invention has been described with reference to heating of the sub-units constituting the multi-occupancy dwelling, it will be understood that the present invention is applicable to the cooling of such sub-units using a cooled intermediate heat transfer fluid.

While the present invention has been described with reference to a preferred embodiment wherein fluid flow through the conduit member is sensed by a flow valve disposed in the conduit member including a zone valve, it will be understood that the time meter may be energized by any assembly associated with fluid flow through the conduit, e.g. energizing of a circulating pump associated with a conduit member of each sub-unit of the multi-occupancy dwelling.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. An energy consumption indicating system for a multi-occupancy dwelling, including a plurality of units, which comprises:

a space heat exchanger and a thermostat to provide heating control in the system, said space heat exchanger and the thermostat provided in each unit;

a main heat exchanger having an outlet conduit, an inlet conduit and at least one circulating pump responsive to the thermostat control and in fluid flow communication with said outlet and inlet conduits;

a separate conduit member in fluid communication with said outlet conduit of said main heat exchanger and with a space heat exchanger in each unit wherein fluid flow through a conduit member of each unit is effected in response to activation of said thermostat disposed in a respective unit;

fluid flow sensing means disposed in said separate conduit member activated by fluid flow through said separate conduit member; and time meter means energized by said fluid flow sensing means to measure time duration of fluid flow through said separate conduit member.

2. The energy consumption indicating system for a multi-occupancy dwelling as defined in claim 1 and further including a zone valve disposed in each of said separate conduit members operatively associated with said thermostat of each unit to permit fluid flow through said conduit member when said zone valve is energized by said thermostat.

* * * * *